United States Patent Office 2,709,185
Patented May 24, 1955

2,709,185

PROCESS OF REACTING CARBON, A POLY-FLUORO METAL AND CHLORINE

Earl L. Muetterties, Hockessin, Del., assignor to E. I. du Pont de Nemours and Company, Wilmington, Del., a corporation of Delaware No Drawing. Application January 19, 1954,
Serial No. 405,042

9 Claims. (Cl. 260—653)

This invention relates to a new process of preparing halogenated hydrocarbons. More particularly, it relates to a process of preparing compounds containing only carbon, chlorine and fluorine, such compounds being hereinafter called chlorofluorocarbons.

The chlorofluorocarbons, a typical representative of which is dichlorodifluoromethane, are valuable compounds, particularly as refrigerant liquids, also as dielectric fluids and ingredients of insecticidal compositions, e. g., as propellants in acrosols. These materials are at present usually prepared by costly methods involving the replacement of chlorine by fluorine by means of selected metallic fluorides either alone or in combination with hydrogen fluoride. Processes of this kind are complicated by the fact that several steps are required to attain the final product. It has been proposed (U. S. Patent 2,407,129) to prepare chlorofluorocarbons by reacting hydrogen fluoride and chlorine simultaneously with methane over a chromium fluoride catalyst. This process is useful but still it involves the use of methane, which must first be appropriately separated from natural gas mixtures containing it, or synthesized by hydrogenation of coal.

This invention has an an object a new process for the preparation of chlorofluorocarbons, i. e., completely halogenated hydrocarbons where the halogens present are chlorine and fluorine. A further object is the provision of a one-step process employing starting materials of which two, carbon and chlorine, are very cheap. The third reactant is one or more of a variety of inorganic fluorides, some of which are readily and economically available. Other objects will appear hereinafter.

These objects are accomplished by the present invention wherein chlorine and a fluoride of a polyvalent metal, i. e., a fluoride having a plurality of fluorine atoms attached to one atom of a metal, said fluoride comtaining only polyvalent metals, are reacted, at a temperature of at least 400° C., with, as the sole carbon containing reactant, elementary carbon.

The division of elements in metals and nonmetals is well recognized in modern chemistry. It is discussed in recent textbooks such as, for example, Deming's "General Chemistry" (John Wiley and Sons, Inc., 5th edition, pp. 11–13) or Morgan and Burstall, "Inorganic Chemistry—A Survey of Modern Developments" (W. Heffer and Sons, Ltd., pp. 18–19). Deming's Periodic Table, used in his book referred to above and in many other reference books, such as the Handbook of Chemistry and Physics, 30th edition (1947), published by the Chemical Rubber Publishing Co., shows that the nonmetals are the rare gases, the elements of group VII–A, the elements of group VI–A of atomic number 8 to 52, inclusive, the elements of group V–A of atomic number 7 to 33, inclusive, carbon and silicon in group IV–A and boron in group III–A. Correspondingly, the metals are the remaining elements, and the polyvalent metals are the elements of groups II, VIII, III–B, IV–B, V–B, VI–B, VII–B and the elements in groups III–A, IV–A, V–A and VI–A which have atomic numbers above 5, 14, 33 and 52, respectively.

The process of the present invention can be carried out in various ways. In the method illustrated in the following examples, the three reactants (carbon, chlorine and metallic fluoride) are mixed in a corrosion-resistant pressure vessel which is then sealed and heated, if desired with agitation, at the reaction temperature for a time sufficient to bring about substantial conversion. In another modification, a mixture of chlorine and a volatile metallic fluoride is passed through carbon heated to the reaction temperature in a suitably designed reactor, for example a tubular reactor made of refractory glass, nickel or other suitable material, or chlorine is passed through an intimate mixture of carbon and polyvalent metal fluoride. In yet another embodiment, an electric arc is used having carbon electrodes, through which is passed a mixture of chlorine and a volatile metallic fluoride, or chlorine is passed through an electric arc having a carbon anode and a cathode made of carbon containing the metallic fluoride, which volatilizes at the temperature of the arc. Whatever method is used, the reaction products, which are gaseous or readily volatile, are suitably treated to remove any acidic material present, and fractionated to isolate the various constituents.

The relative ratios of the reactants are not critical. When fluoride and chlorine are brought into contact with carbon, it is desirable for best results, that the gram atom ratio of fluorine to chlorine be in general chosen within the range from 0.03:1 to 3:1, and preferably from 0.25:1 to 1:1. In general the carbon is present in considerable excess.

At temperatures below about 400° C. the conversions become impractical with most metallic fluorides. Therefore, it is desirable to operate at temperatures above 400° C. and preferably above 450° C. The reaction temperature can be as high as can practically be obtained by known means. For example, the reaction can be carried out using as source of carbon the electrodes of a carbon arc, where the temperature is estimated to be in the range of 2500 to 3500–4000° C. In general, however, the preferred temperature range is from 450 to 1500° C.

Any form of carbon, whether amorphous or crystalline, is suitable for the purpose of this invention. Thus, there can be used coal, graphite, charcoal, the various forms of carbon black such as lamp black, acetylene black, bone black, etc. In general, higher conversions are obtained with active carbon, of which many well-known varieties are available commercially. Active carbon is very finely divided, porous carbon having a total surface area of at least 20 square meters per gram (Hassler, "Active Carbon," Chemical Publishing Co., 1951, p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons. A fluidized carbon/fluoride bed can be reacted with chlorine.

Of the fluorides suitable for the purpose of this invention, i. e., the fluorides having a plurality of fluorine atoms bonded to a metal, each metal of said fluoride being polyvalent, some are natural products and others are available commercially or can be prepared by methods described in the literature. The polyvalent metal fluorides can be used in any of their valence states providing a plurality of fluorine atoms is attached to the metal but it is preferred to use the lower valence fluorides for the reason that they are in many cases obtainable without having to resort to the use of free fluorine, and therefore they are more readily accessible than the higher fluorides.

The reactants should preferably be substantially anhydrous, although the reaction can tolerate the presence of some water. It is often desirable to dehydrate the carbon prior to reaction, since carbon, especially of the active or absorbent variety, can retain significant amounts of water even at high temperatures. The metallic fluorides are desirably used in anhydrous, rather than hydrated, form.

The process of the present invention normally gives a mixture of chlorofluorocarbons, the preponderant constituents of which are in general the completely halogenated chlorofluoromethanes, with lesser amounts of the completely halogenated chlorofluoroethanes. Carbon tetrafluoride is normally present in varying amounts in the reaction product, and sometimes carbon tetrachloride is formed in minor amounts. Other products, such as chlorodifluoromethane or perfluoroethane, are occasionally found. In addition, acidic materials are sometimes formed, owing to the presence of chlorine and moisture in the reaction mixture. The reaction product may also contain unreacted chlorine and unreacted metallic fluoride, or compounds of the metal whose fluoride was employed. The chlorofluorocarbons can be isolated by passing the gaseous reaction mixture through cold condensers and fractionating the condensate. Prior to fractionation, the crude reaction product is preferably separated from the unreacted chlorine by distillation, or it can be passed through liquid scrubbing solutions such as aqueous alkaline solution to remove unreacted chlorine, acidic materials and other unwanted products.

In general, higher temperatures and/or the presence of polyvalent metal halides other than the fluorides, which can be used as catalysts, favor the formation of the more fully fluorinated products, and also the formation of halomethanes over haloethanes. High chlorine concentrations favor the formation of products containing less fluorine and more chlorine.

The invention is illustrated in greater detail in the following examples, in which parts are by weight unless otherwise noted. In these examples, the carbon used was dried before reaction by heating at 500° C. in a nitrogen atmosphere for three hours or more. The metallic fluorides were also dried at elevated temperature, either in an atmosphere of nitrogen or in an atmosphere of anhydrous hydrogen fluoride.

*Example I*

A mixture of 10 parts of carbon black, 48 parts of chlorine and 60 parts of calcium fluoride was heated at 500° C. under autogenous pressure for 3 hours. There was obtained 30 parts of gaseous product, of which 7.9 parts was alkali-insoluble. Fractionation of this product gives a yield of, on a molar basis, 1% carbon tetrafluoride, 60% chlorotrifluoromethane, 30% dichlorodifluoromethane and 10% trichlorofluoromethane, which products were identified by infrared analysis.

*Example II*

The experiment of Example I was repeated except that the reaction mixture contained in addition 3 parts of iron III chloride, used as a catalyst. Fractionation of the alkali-insoluble gas (8.8 parts) gave the following products, identified by their boiling points and infrared spectra in the indicated molar proportions: carbon tetrafluoride, 60%; chlorotrifluoromethane, 30%; dichlorodifluoromethane, 6%; trichlorofluoromethane, 1%.

*Example III*

A mixture of 10 parts of carbon black, 36 parts of chlorine and 49 parts of cobalt II fluoride was heated at 500° C. under autogenous pressure for 3 hours. Of the 23 parts of gaseous reaction product obtained, 3.7 parts was alkali-insoluble. Fractionation of this product yields on a molar basis, 14% carbon tetrafluoride, 75% chlorotrifluoromethane, 2% dichlorodifluoromethane, 4% trichlorofluoromethane, 0.5% 1,1-dichlorotetrafluoroethane, and traces of 1,2-dichlorotetrafluoroethane, chloropentafluoroethane and chlorodifluoromethane, identified by infrared analysis.

*Example IV*

A mixture of 20 parts of graphite, 27 parts of chlorine and 90 parts of mercury II fluoride was heated at 500° C. under autogenous pressure for 3 hours. There was obtained 12 parts of gaseous product which on fractionation yields hydrogen fluoride, presumably formed by adventitious moisture, and, on a molar basis, 30% carbon tetrafluoride, 5% perfluoroethane, 5% perfluoropropane and smaller amounts of chlorotrifluoromethane, dichlorodifluoromethane and trichlorofluoromethane. These products were identified by infrared analysis.

*Example V*

A mixture of 10 parts of carbon black, 36 parts of chlorine and 89 parts of bismuth III fluoride was heated at 500° C. under autogenous pressure for 3 hours. Of the 20 parts of gaseous reaction product, 5 parts was insoluble in alkali. Fractionation of this material yields, on a molar bases, 40% carbon tetrafluoride, 55% chlorotrifluoromethane, 0.5% each of dichlorodifluoromethane, trichlorofluoromethane, chloropentafluoroethane and 1,1-dichlorotetrafluoroethane, and traces of 1,2-dichlorotetrafluoroethane and chlorodifluoromethane, all identified by infrared analysis.

*Example VI*

A mixture of 10 parts of carbon black, 36 parts of chlorine and 79 parts of tin II fluoride was heated at 500° C. under autogenous pressure for three hours. The gaseous reaction product yields, on fractionation, approximately equimolar amounts of carbon tetrafluoride and chlorotrifluoromethane, with traces of trichlorofluoromethane and carbon tetrachloride, as identified by infrared analysis.

*Example VII*

An intimate mixture of 80 parts of calcium fluoride and 30 parts of carbon black was packed in the center section of a Hastelloy C tubular reactor of 30 inch length. A slow stream of nitrogen was passed through the reactor while the latter was heated to 900° C. for a period of ten hours. A receiver cooled with liquid nitrogen was then attached to the exit end of the reactor. While the temperature of the reactor was held at 900° C., a total of 25 parts of chlorine was passed through during a period of 1.5 hours. Fractionation of the product collected in the receiver gives carbon tetrachloride, chlorotrifluoromethane, and minor amounts of dichlorodifluoromethane and hydrogen fluoride, all of which were identified by infrared analysis.

*Example VIII*

A mixture of 10 parts of carbon black, 50 parts of tungsten VI fluoride and 48 parts of chlorine was heated at 500° C. under autogenous pressure for 3 hours. There was obtained 61 parts of gaseous product, of which 4.1 parts was insoluble in alkali. This alkali-insoluble gas on fractionation yields the following products in the indicated molar ratios: carbon tetrafluoride 15%, chlorotrifluoromethane 65%, dichlorodifluoromethane 5%, and trichlorofluoromethane 2%, as identified by infrared analysis.

The invention has been illustrated by the use of certain specific metallic fluorides, but it is to be understood that this process of chlorofluorination of carbon can make use of any fluoride, containing only polyvalent metal and a plurality of fluorine atoms attached to a metal, preferably a fluoride $MF_n$ wherein M is a polyvalent metal and $n$ is a plural integer, preferably 2. While all such metal fluorides are operable, a number of metals, e. g., most of those belonging to the lanthanide and actinide series, are so rare as to be of very little practical value for the purpose of this invention. Other metals, not in the rare earth class, have such high atomic weights that their fluorides contain little fluorine on a weight basis, and are therefore not preferred for reasons of economy. For these reasons, this invention is particularly directed to the use of the more accessible and more economical polyvalent metal fluorides, which are the fluorides of those polyvalent metals having atomic numbers of up to 56, inclusive. Still more specifically, it is preferred to use the fluorides of elements within group II having atomic number from 4 to 56, inclusive (these elements being beryllium, magnesium, calcium, strontium and barium of group II-A) and zinc and cadmium of group II B because they give good conversions and are readily accessible. Within this preferred class, the best results from the standpoints of conversion, economy and convenience have been obtained with calcium fluoride.

Fluorides of polyvalent metals suitable for use in this invention, other than those already illustrated, include, for example, magnesium fluoride, barium fluoride, titanium IV fluoride, molybdenum II fluoride, manganese III fluoride, iron II fluoride, iron III fluoride, nickel II fluoride, zinc II fluoride, lead II fluoride, antimony III fluoride and the like. Mixtures of two or more such fluorides can be used. Complex fluorides, e. g., ternary fluorides, can be used, including fluorides of metals and nonmetals, such as lead fluosilicate, $PbF_2 \cdot SiF_4$. In this connection, one or two fluorides of nonmetallic elements, such as silicon IV fluoride or arsenic III fluoride, can be used as such in the process of this invention, but they give at best very low conversions.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process wherein chlorine is reacted at a temperature of at least 400° C. with an inorganic fluoride having a plurality of fluorine atoms attached to one atom of a metal, each metal in the fluoride being polyvalent and as the sole remaining reactant, elementary carbon and the resultant chlorofluorocarbons are isolated.

2. A process wherein chlorine is reacted at a temperature of at least 400° C. with, as the only other reaction component, a reaction mass composed essentially of carbon and an inorganic fluoride having a plurality of fluorine atoms attached to one atom of a metal, each metal in the fluoride being polyvalent, and the resultant chlorofluorocarbons are isolated.

3. Process of claim 2 wherein there is used as catalyst a polyvalent metal halide wherein the halogen is of atomic number higher than 9.

4. A process wherein chlorine is reacted at a temperature of at least 400° C. with, as essentially the sole additional reactants, carbon and a fluoride $MF_n$, wherein M is a polyvalent metal and $n$ is a plural integer, and the resultant chlorofluorocarbons are isolated.

5. A process wherein chlorine is reacted at a temperature of at least 400° C. with, as essentially the sole additional reactants, carbon and a fluoride $MF_2$, wherein M is a polyvalent metal, and the resultant chlorofluorocarbons are isolated.

6. A process wherein chlorine is reacted at a temperature of at least 400° C. with, as essentially the sole additional reactants, carbon and a fluoride $MF_n$, wherein M is a polyvalent metal of atomic number not higher than 56, and the resultant chlorofluorocarbons are isolated.

7. A process wherein chlorine is reacted at a temperature of at least 400° C. with, as essentially the sole additional reactants, carbon and a fluoride $MF_2$, wherein M is a polyvalent metal of atomic number not higher than 56, and the resultant chlorofluorocarbons are isolated.

8. A process wherein chlorine is reacted at a temperature of at least 400° C. with, as essentially the sole additional reactants, carbon and a fluoride $MF_2$, wherein M is a group II metal of atomic number not higher than 56, and the resultant chlorofluorocarbons are isolated.

9. A process wherein chlorine is reacted at a temperature of at least 400° C. with, as essentially the sole additional reactant, carbon and calcium fluoride, and the resultant chlorofluorocarbons are isolated.

References Cited in the file of this patent

UNITED STATES PATENTS

| 1,996,115 | Lazier | Apr. 2, 1935 |
| 2,407,129 | Benning | Sept. 3, 1946 |
| 2,456,027 | Simons | Dec. 14, 1948 |
| 2,684,987 | Mantell et al. | July 27, 1954 |